United States Patent [19]
Baek et al.

[11] Patent Number: 5,544,151
[45] Date of Patent: Aug. 6, 1996

[54] DUAL RECEIVE, DUAL TRANSMIT FAULT TOLERANT NETWORK ARRANGEMENT

[75] Inventors: Young S. Baek; Keun W. Lee; Beyong D. Min; Gang I. Choi, all of Daejeon, Rep. of Korea

[73] Assignee: Electronics and Telecommunications Research Institute, Seoul, Rep. of Korea

[21] Appl. No.: 382,539

[22] Filed: Feb. 2, 1995

[30] Foreign Application Priority Data

Dec. 2, 1994 [KR] Rep. of Korea ............... 1994-32594

[51] Int. Cl.⁶ .................................................. H04L 12/437
[52] U.S. Cl. ................... 370/16.1; 370/85.12; 370/85.15; 370/94.1
[58] Field of Search ................... 370/16, 16.1, 85.5, 370/85.12, 85.15, 60, 94.1, 55; 340/825.03, 825.05, 827; 379/279

[56] References Cited

U.S. PATENT DOCUMENTS

| | | | |
|---|---|---|---|
| 4,048,446 | 9/1977 | Hafner et al. | 370/16.1 |
| 4,195,351 | 3/1980 | Barner et al. | 340/825.05 |
| 4,837,856 | 6/1989 | Glista, Jr. | 340/825.05 X |
| 5,131,041 | 7/1992 | Brunner et al. | 370/58.2 |
| 5,341,364 | 8/1994 | Marra et al. | 370/16.1 |

FOREIGN PATENT DOCUMENTS

0448494A2 9/1991 European Pat. Off. .
0459756A2 12/1991 European Pat. Off. .

OTHER PUBLICATIONS

Hector Garcia–Molina et al., "Agressive Transmissions over Redundant Paths", IEEE, 1991, pp. 198–207.
Jon T. Currie, "Finding Your Way Around Rings", *Rockwell Workshop*, pp. 1–16.
J. Baudron et al., "Availability and Survivability of SDH Networks", *Electrical Communication—4th Quarter 1993*, pp. 339–348.

*Primary Examiner*—Hassan Kizou
*Attorney, Agent, or Firm*—Spencer & Frank

[57] ABSTRACT

A fault permission network arrangement having a plurality of packet transfer units connected in a ring form. Each of the plurality of packet transfer units comprises first and second nodes, each of the first and second nodes having two inputs and two outputs, for inputting the same data from previous-stage two nodes, abandoning one of the input data and transferring the other data to subsequent-stage two nodes, and an interface unit having two inputs and two outputs connected to the first and second nodes through serial links, respectively, for transferring a packet from a communication system to the first and second nodes, the interface unit selecting one of the same two data from the first and second nodes and transferring the selected data to the communication system. According to the present invention, the selected packet can be transferred to a destination although faults occur at a plurality of nodes, respectively.

3 Claims, 5 Drawing Sheets

DUAL RECEIVE, DUAL TRANSMIT FAULT TOLERANT NETWORK ARRANGEMENT

BACKGROUND OF THE INVENTION

1. Field of the Invention

The present invention relates in general to fault tolerant network arrangements, and more particularly to a fault permission network arrangement in which a dual receive dual transmission (referred to hereinafter as DRDT) network is used to first process a fault upon occurrence of the fault which is then detected through an individual function.

2. Description of the Prior Art

Generally, a large-scale system comprises modules by functions and an interface network which interconnects the modules to one another. However, the system cannot perform a normal operation when a fault occurs in the interface network.

For example, a distributed system comprises an interface network for interconnecting computers to one another. A fault may occur in the interface network. The occurrence of the fault affects the entire operation of the system, so that a normal function cannot be performed by the system. In order to prevent this outcome and to thus enhance the reliability of the system, a dual interface network may be employed in the system.

FIG. 1A is a view illustrating an arrangement of a conventional dual fiber distributed data interface (referred to hereinafter as FDDI) network under a normal condition and FIG. 1B is a view illustrating an arrangement of the conventional dual FDDI network upon occurrence of a fault. The conventional dual FDDI network comprises a dual line. Upon the occurrence of the fault at a certain node, the remaining nodes are rearranged through a single line so that they can normally communicate with one another. Namely, under the normal condition, the communications are performed in the opposite directions through the two lines as shown in FIG. 1A. If the fault occurs at a certain node 12D, the remaining nodes 12A–12C are rearranged through the single line as shown in FIG. 1B. As a result, the normal nodes can communicate with one another. In this manner, the conventional dual FDDI network must first detect the fault to process it. With the fault detected, the remaining nodes are rearranged through the single line, for message transmission and reception.

However, the above-mentioned conventional dual FDDI network with the dual line has a disadvantage in that the entire system cannot perform the normal operation if the fault occurs again at one of the normal nodes or a link after the single line-rearrangement.

SUMMARY OF THE INVENTION

Therefore, the present invention has been made in view of the above problems, and it is an object of the present invention to provide a fault tolerant network arrangement in which a DRDT network is used to first process a fault upon occurrence of the fault which is then detected through an individual function.

It is another object of the present invention to provide a fault tolerant network arrangement in which a system can perform a normal operation although faults occur at a plurality of nodes, respectively.

It is still another object of the present invention to provide a fault tolerant network arrangement in which a packet transfer time is not affected by occurrence of a fault.

In accordance with the present invention, the above and other objects can be accomplished by provision of a fault permission network arrangement having a plurality of packet transfer units connected in a ring form. Each of the plurality of packet transfer units comprises first and second nodes, each of the first and second nodes having two inputs and two outputs, for inputting the same data from two nodes of a previous-stage, abandoning one of the input data and transferring the other data to two nodes of a subsequent-stage; and an interface unit having two inputs and two outputs connected to the first and second nodes through serial links, respectively, for transferring a packet from a communication system to the first and second nodes, the interface unit selecting one of the same two data from the first and second nodes and transferring the selected data to the communication system.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1A:
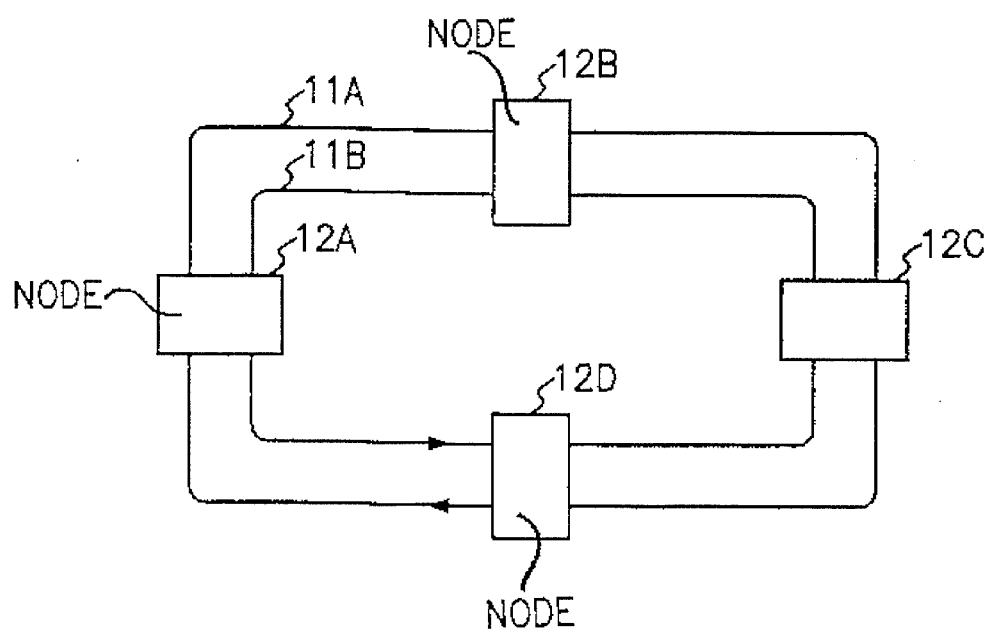
FIG. 1A is a view illustrating an arrangement of a conventional dual FDDI network under a normal condition.
Figure 1B:
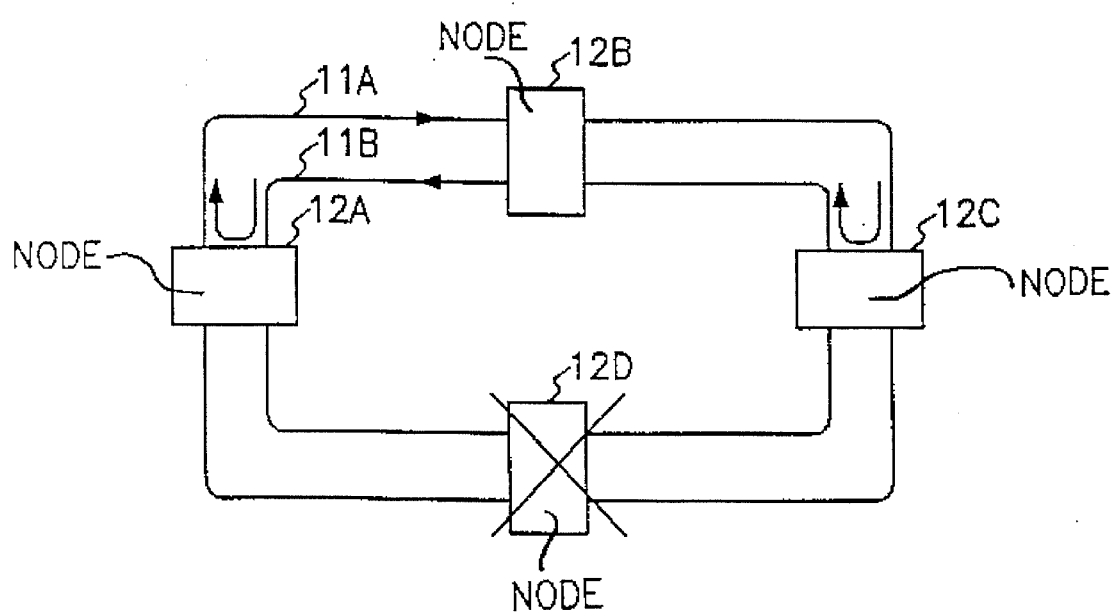
FIG. 1B is a view illustrating an arrangement of the conventional dual FDDI network upon occurrence of a fault.
Figure 2:
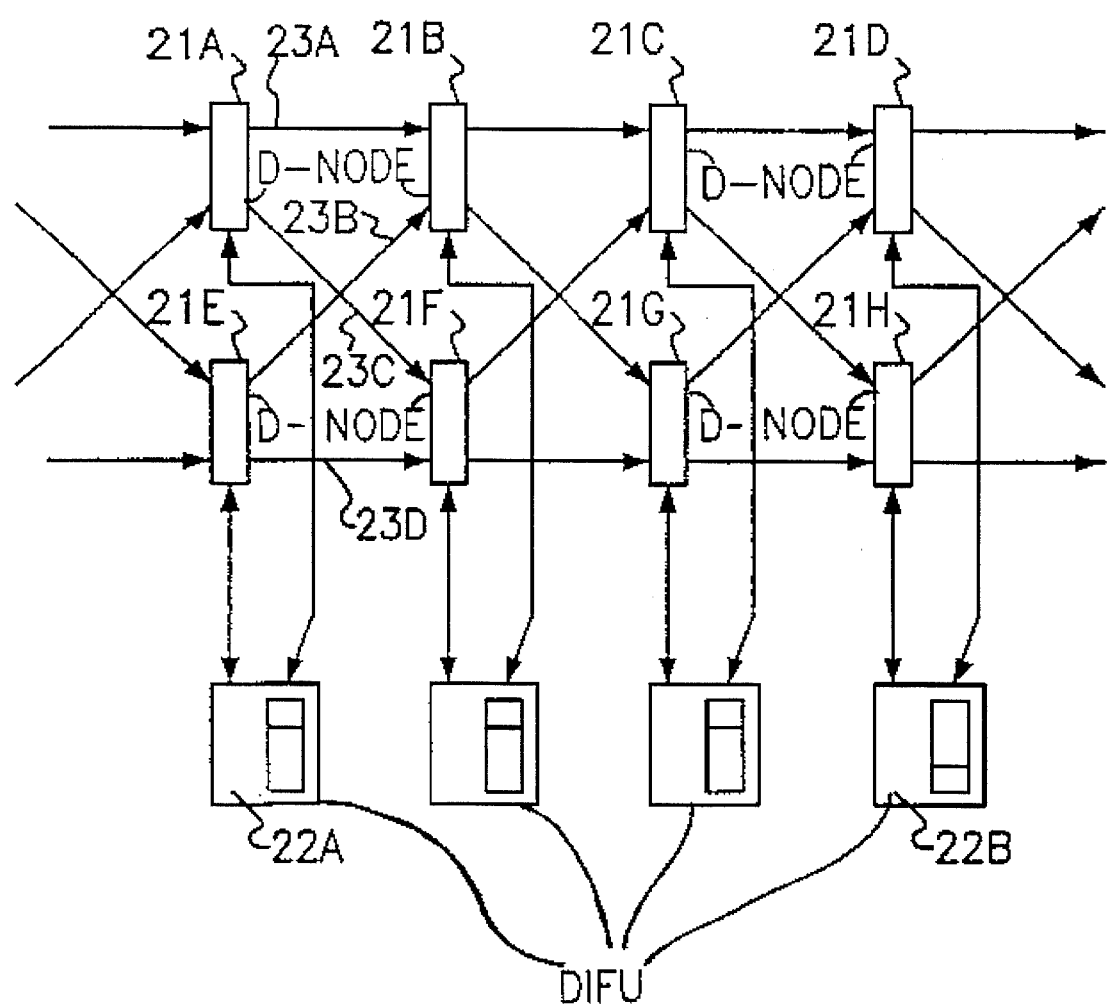
FIG. 2 is a view illustrating an arrangement of a DRDT network in accordance with the present invention.

Referring to FIG. 2, there is shown a view illustrating an arrangement of a DRDT network in accordance with the present invention. As shown in this drawing, the DRDT network comprises a ring coupling structure in which a first-stage DRDT node (referred to hereinafter as D-node) has an input connected to an output of a last-stage D-node.

A message sent from a transmission system is packeted by a DRDT interface unit (referred to hereinafter as DIFU) 22A into two same pieces, which are then transferred to D-nodes 21A and 21E, respectively. The D-node 21A abandons one of the two input packets and transfers the other packet to subsequent-stage D-nodes 21B and 21F through two links 23A and 23C, respectively.

The D-node 21E abandons one of the two input packets and transfers the other packet to the subsequent-stage D-nodes 21B and 21F through two links 23B and 23D, respectively.

In a similar manner, each of the D-nodes 21B and 21F abandons one of the two input packets and transfers the other packet to subsequent-stage D-nodes 21C and 21G. In this manner, the packets are transferred up to last-stage D-nodes 21D and 21H. Each of the last-stage D-nodes 21D and 21H selects one of the input packets and transfers the selected packet to a DIFU 22B at a receiving stage. The DIFU 22B selects one of the two input packets and sends the selected packet to the system.

Figure 3:
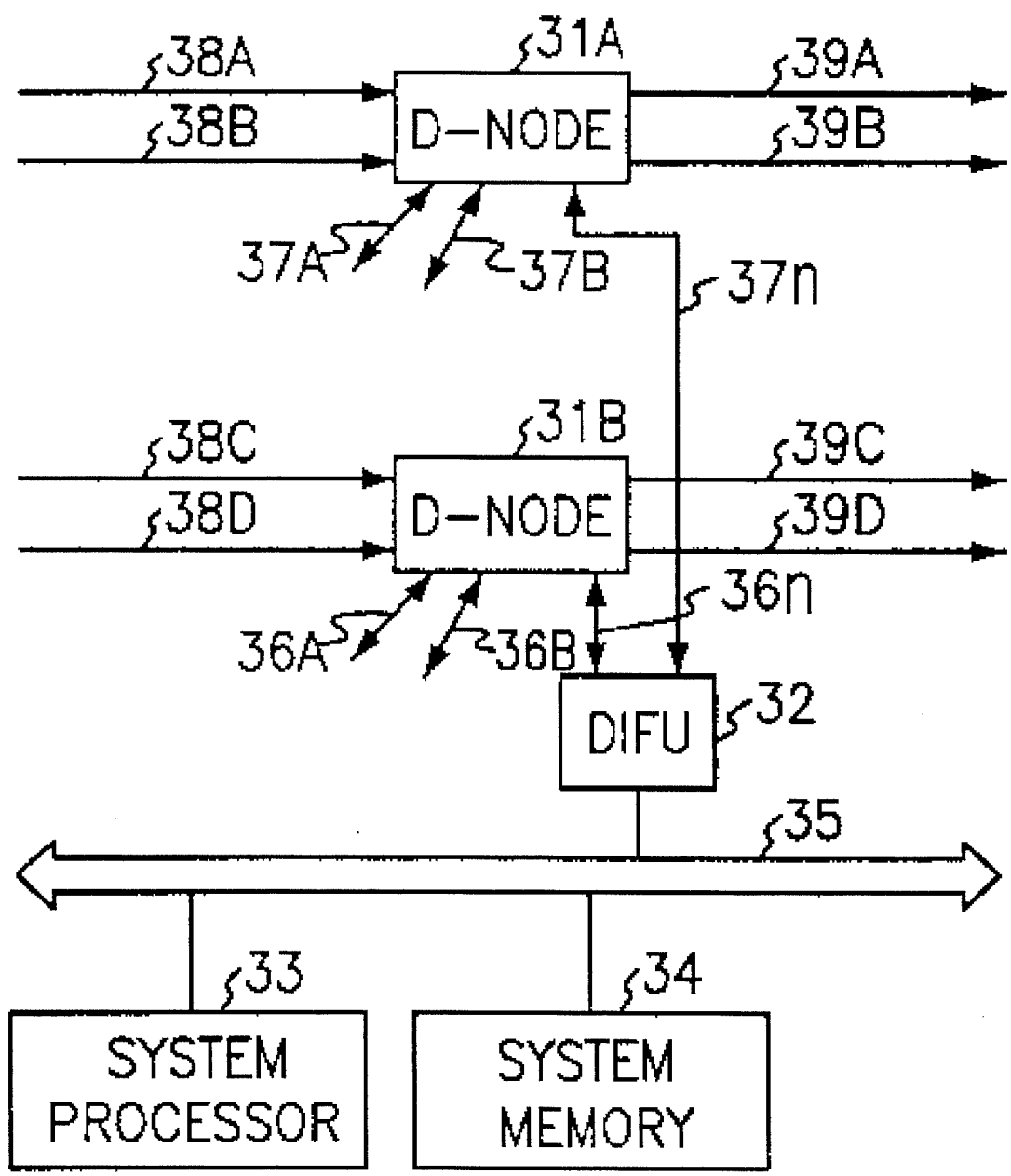
FIG. 3 is a view illustrating an arrangement of the DRDT network coupled to a system in accordance with the present invention.

FIG. 3 is a view illustrating an arrangement of the DRDT network coupled to a system in accordance with the present invention. As shown in this drawing, the DRDT network comprises two D-nodes 31A and 31B, and a DIFU 32 connected to the system.

The D-node 31A has two inputs 38A and 38B, two outputs 39A and 39B and one or more links 37A–37N connected to one or more systems. Similarly, the D-node 31B has two inputs 38C and 38D, two outputs 39C and 39D and one or more links 36A–36N connected to one or more systems. The DIFU 32 is coupled to the D-nodes 31A and 31B through the links 37 and 36, respectively.

Figure 4:
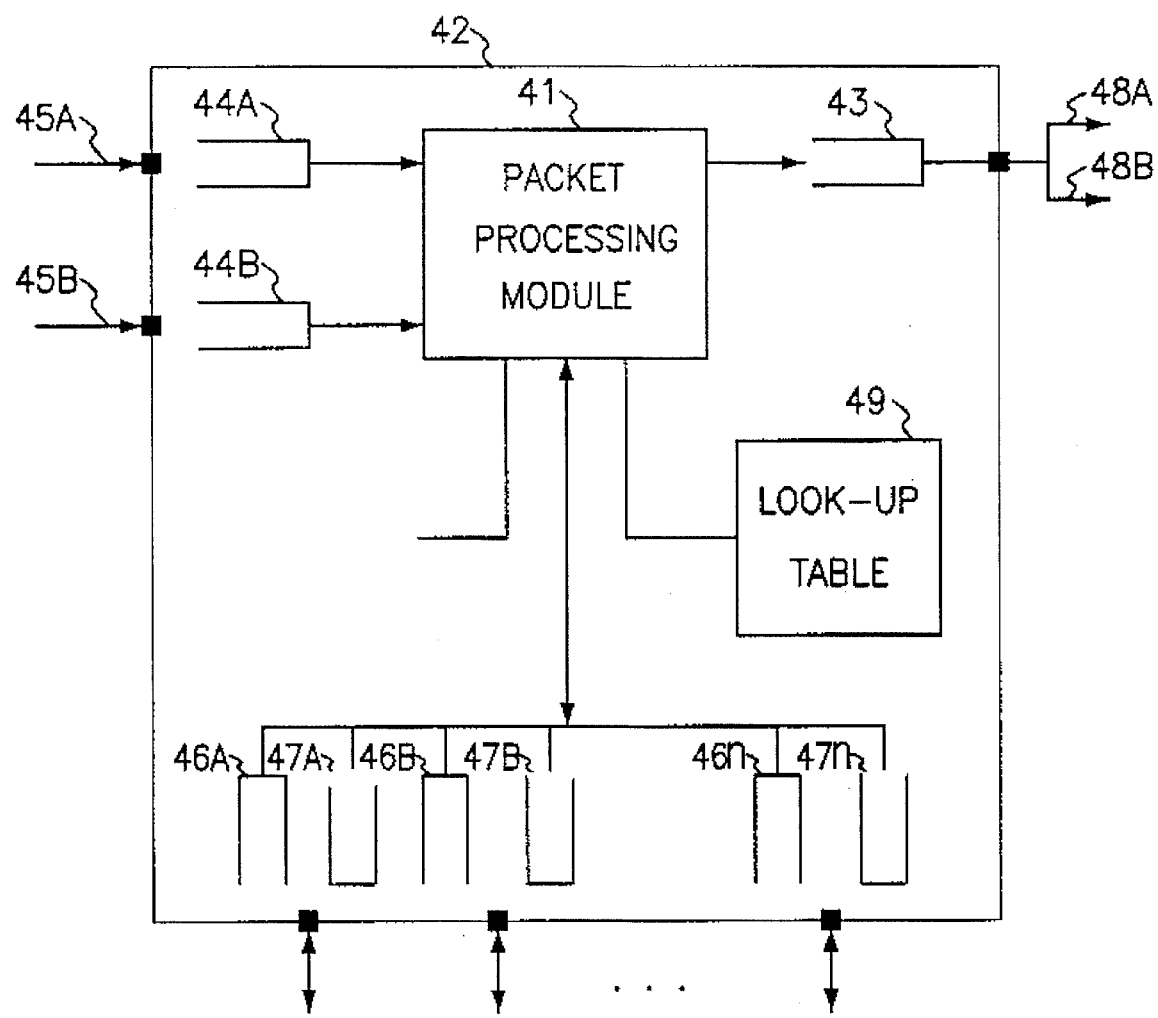
FIG. 4 is a view illustrating a construction of a DRDT node in FIG. 2.

Referring to FIG. 4, there is shown a construction of a D-node 42. As shown in this drawing, the D-node 42 comprises input buffers 44A and 44B for storing two same packets from two input ports 45A and 45B, respectively. Also, the D-node 42 comprises a packet processing module 41 and a look-up table 49 for selecting one of the stored packets from the input buffers 44A and 44B and abandoning the other packet.

The selected packet is transferred to an output buffer 43 or to a system through an output buffer 47. The packet to the output buffer 43 is transferred to a subsequent-stage D-node through two output links 48A and 48B. The subsequent-stage D-node transfers the input packets to a subsequent-stage D-node in a similar manner.

The packet to the output buffer 47 is transferred to the system through the DIFU as mentioned-above. Packets transferred from the system through a DIFU are temporarily stored in input buffer 46.

Figure 5:
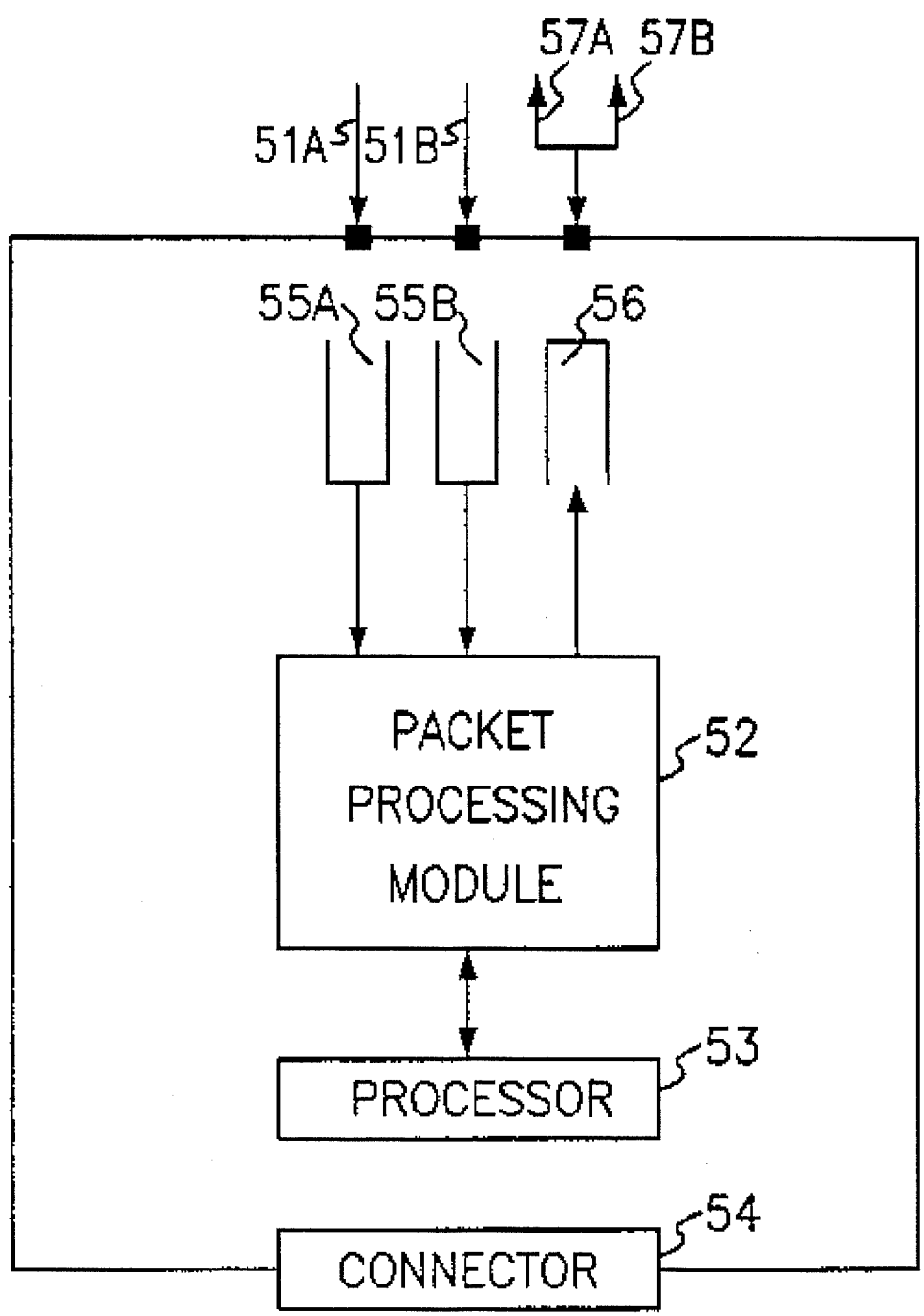
FIG. 5 is a view illustrating a construction of a DRDT interface unit in FIG. 2.

Referring to FIG. 5, there is shown a construction of the DIFU for coupling the D-node to the system. As shown in this drawing, the DIFU comprises input buffers 55A and 55B for storing the packets from the D-node, respectively. The DIFU further comprises a packet processing module 52 for selecting one of the stored packets from the input buffers 55A and 55B and abandoning the other packet. The packet to be transferred to the system is stored into an output buffer 56. The stored packet from the output buffer 56 is transferred to the system through output links 57A and 57B.

In FIGS. 4 and 5, the multiple packet transfer can be accomplished by active and passive elements. In particular, the multiple packet transfer can be performed by the use of an optical splitter in optical fiber applications.

As apparent from the above description, according to the present invention, the DRDT network comprises the D-nodes connected on the serial links independent of the DIFU. The use of the two D-nodes results in the repetitive duplicate production of the packets. The selection of one of the input packets makes it possible to transfer the selected packet to a destination although faults occur at a plurality of nodes, respectively. Further, because of the physical separation of the DIFU from the D-node, the fault has no or minimum effect on the entire network although it occurs in the system coupled to the node.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fault tolerant network arrangement comprising a plurality of packet transfer means connected in a ring form, each of said plurality of packet transfer means comprising:

first and second nodes, each of said first and second nodes having two inputs and two outputs, for inputting the same data from two nodes of a previous-stage, abandoning one of the input data and transferring the other data to two nodes of a subsequent-stage and each node having interface input/output means for inputting and outputting data; and interface means having first and second inputs and first and second outputs connected to the input/output means of said first and second nodes through serial links, respectively, for transferring a packet from a communication system to each of said first and second nodes, and for selecting one of same two data received from said first and second nodes, respectively, and transferring the selected data to said communication system.

2. A fault tolerant network arrangement as set forth in claim 1, wherein said interface means includes:

output buffering means for storing temporarily the packet from said communication system and transferring the stored packet to said first and second nodes through said two outputs, respectively;

two input buffering means for inputting the same two data from said first and second nodes through said two inputs and storing temporarily the input data, respectively; and packet processing means for selecting one of the stored data from said two input buffering means.

3. A fault tolerant network arrangement as set forth in claim 1, wherein each of said first and second nodes includes:

two first input buffering means for inputting the same data from the previous-stage two nodes through said two inputs and storing temporarily the input data, respectively;

packet processing means for selecting one of the stored data from said two first input buffering means;

first output buffering means for storing temporarily the selected data from said packet processing means and transferring the stored data to the subsequent-stage two nodes through said two outputs; and a plurality of second output buffering means for storing temporarily the selected data from said packet processing means and transferring the stored data to said communication system through said interface input/output means, and a plurality of second input buffering means storing temporarily the packet from said communication system received through said interface input/output means.

* * * * *

UNITED STATES PATENT AND TRADEMARK OFFICE
CERTIFICATE OF CORRECTION

PATENT NO. : 5,544,151
DATED : August 6, 1996
INVENTOR(S) : Young S. BAEK ET AL.

It is certified that error appears in the above-indentified patent and that said Letters Patent is hereby corrected as shown below:

<u>On the Title Page</u>:

[73] Electronics and Telecommunications Research Institute, Daejeon, Republic of Korea
and
Korea Telecommunication Authority, Seoul, Republic of Korea Signed and Sealed this Fourteenth Day of March, 2000

Attest:

Attesting Officer

Q. TODD DICKINSON

Commissioner of Patents and Trademarks